US008813331B2

(12) United States Patent
Dimmick, III

(10) Patent No.: US 8,813,331 B2
(45) Date of Patent: Aug. 26, 2014

(54) PROCESS OF PREPARING A TURBINE ROTOR WHEEL, A REPAIR WHEEL FOR A TURBINE ROTOR WHEEL, AND A TURBINE ROTOR WHEEL

(75) Inventor: John H. Dimmick, III, Greenville, SC (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 13/074,669

(22) Filed: Mar. 29, 2011

(65) Prior Publication Data

US 2012/0251327 A1 Oct. 4, 2012

(51) Int. Cl.

| | |
|---|---|
| ***B23P 6/00*** | (2006.01) |
| ***B64C 11/04*** | (2006.01) |
| ***F03B 3/12*** | (2006.01) |
| ***B64C 27/48*** | (2006.01) |
| ***F01D 5/30*** | (2006.01) |
| ***F01D 5/00*** | (2006.01) |
| ***F01D 25/28*** | (2006.01) |
| *B23P 19/04* | (2006.01) |
| *F04D 29/34* | (2006.01) |

(52) U.S. Cl.

CPC .............. *F01D 5/005* (2013.01); *F01D 25/285* (2013.01); *F05D 2230/80* (2013.01)

USPC .................. 29/402.06; 29/402.01; 29/402.05; 29/402.11; 29/402.19; 29/889.1; 416/215; 416/216; 416/219 R; 416/248

(58) Field of Classification Search

USPC ................. 29/889.1, 402.01, 402.05, 402.06, 29/402.11, 402.19; 416/215, 216, 219 R, 416/248

See application file for complete search history.

(56) References Cited

U.S. PATENT DOCUMENTS

| | | | | |
|---|---|---|---|---|
| 5,101,557 | A * | 4/1992 | Mueller et al. | 29/889.7 |
| 6,375,423 | B1 * | 4/2002 | Roberts et al. | 416/2 |
| 6,494,683 | B1 * | 12/2002 | Nolan et al. | 416/219 R |
| 6,769,877 | B2 * | 8/2004 | Martin et al. | 416/193 A |
| 6,837,685 | B2 * | 1/2005 | Pierre | 416/219 R |
| 7,334,331 | B2 * | 2/2008 | Bouchard et al. | 29/889.23 |
| 8,539,659 | B2 * | 9/2013 | Szela et al. | 29/402.13 |
| 8,640,942 | B1 * | 2/2014 | Ozbaysal et al. | 228/119 |
| 8,689,441 | B2 * | 4/2014 | Guo et al. | 29/889.2 |
| 2003/0091399 | A1 * | 5/2003 | Nolan et al. | 407/15 |
| 2004/0172826 | A1 * | 9/2004 | Memmen et al. | 29/889.1 |
| 2009/0304473 | A1 * | 12/2009 | Holze et al. | 409/131 |
| 2009/0320288 | A1 * | 12/2009 | Yelistratov et al. | 29/889.1 |
| 2010/0162544 | A1 * | 7/2010 | Sassatelli et al. | 29/23.51 |
| 2011/0008172 | A1 * | 1/2011 | Jette et al. | 416/219 R |
| 2012/0237349 | A1 * | 9/2012 | Rajarajan et al. | 416/219 R |
| 2013/0183157 | A1 * | 7/2013 | Seetharaman | 416/219 R |
| 2013/0205589 | A1 * | 8/2013 | Holmes et al. | 29/889.1 |
| 2013/0209253 | A1 * | 8/2013 | Zemitis et al. | 416/1 |
| 2013/0232792 | A1 * | 9/2013 | Quinones et al. | 29/889.1 |
| 2013/0247377 | A1 * | 9/2013 | Hathiwala et al. | 29/889.1 |
| 2013/0259694 | A1 * | 10/2013 | Hirano et al. | 416/219 R |

* cited by examiner

*Primary Examiner* — Essama Omgba
*Assistant Examiner* — Darrell C Ford
(74) *Attorney, Agent, or Firm* — McNees Wallace & Nurick LLC

(57) ABSTRACT

A process of preparing a turbine rotor wheel, a repair tool for machining a turbine rotor wheel, and a turbine rotor wheel are disclosed. The process includes providing the turbine rotor wheel, the turbine rotor wheel having a dovetail slot, a cooling slot, and a dovetail acute corner formed by the dovetail slot and the cooling slot and removing a stress region from the dovetail acute corner. The repair tool permits removal of strained material while also reducing the operating stress of the feature. The turbine rotor wheel includes a machined portion resulting in lower stress for the turbine rotor wheel.

15 Claims, 5 Drawing Sheets

--Prior Art--

PROCESS OF PREPARING A TURBINE ROTOR WHEEL, A REPAIR WHEEL FOR A TURBINE ROTOR WHEEL, AND A TURBINE ROTOR WHEEL

FIELD OF THE INVENTION

The present invention is directed to manufactured components and processes of forming, repairing, or otherwise machining manufactured components. More particularly, the present invention relates to turbine components and processes of preparing, forming, repairing, or otherwise machining turbine components.

BACKGROUND OF THE INVENTION

Generally, turbine rotor assemblies include a rotor wheel to which a plurality of blades are coupled. The blades extend radially outward from a platform that extends between an airfoil portion of the blade and a dovetail portion of the blade. The dovetail portion of the blade has at least one pair of dovetail tangs that couples the rotor blade to a complimentary dovetail slot in an outer rim of a rotor wheel.

Dovetail slots in the outer rim of the rotor wheel are sized to receive the dovetail tangs of the dovetail portion of the blade. These blades receive cooling air from a circumferential slot that intersect with the dovetail. Portions of the dovetail slots where the cooling slot intersects can have high stress regions. Mitigating stress can extend the usable fatigue life of the rotor wheel. The stress is caused by a combination of mechanical cyclic loads and thermal cyclic and static loads which can result in the accumulation of strain over time. The stress can be mitigated by complex processes that can include disassembling components for repair, using robotic heads, and/or using five-axis machines. These processes can suffer from drawbacks that they are expensive, are not widely available, involve complex tooling, and result in the rotor wheel being out of service for a long period of time.

Other techniques include using a manual grinding operation to remove fatigued material from the dovetail. However, these uncontrolled processes may introduce undesired high stress concentrations into the dovetail, which may result in reducing the component life capability.

In yet another technique, material may be removed in a concentrated stress region using a controlled break edge method. This method uses a customized edge grinder to follow the contours of the slot edge. Though the shape and consistency of the edge break helps the part meet the intended service life, this method does not significantly reduce the stress nor remove enough strained material to significantly extend the operating life of the feature.

A process of machining a turbine rotor wheel, a repair tool for machining a turbine rotor wheel, and a turbine rotor wheel that do not suffer from the above drawbacks would be desirable in the art.

BRIEF DESCRIPTION OF THE INVENTION

In an exemplary embodiment, a process of preparing a turbine rotor wheel includes providing the turbine rotor wheel, removing strained material and a stress region from a dovetail acute corner. The turbine rotor wheel includes a dovetail slot, a cooling slot, and the dovetail acute corner formed by the dovetail slot and the cooling slot.

In another exemplary embodiment, a repair tool for machining a turbine rotor wheel includes a securing mechanism for engaging and securing the tool to a turbine rotor wheel, a guide mechanism for directing removal along a predetermined angle, and a stop mechanism for limiting removal to a predetermined depth. The guide mechanism and the stop mechanism permit removal of a stress region from a dovetail acute corner of the turbine rotor wheel. The turbine rotor wheel includes a dovetail slot, a cooling slot, and the dovetail acute corner formed by the dovetail slot and the cooling slot.

In another exemplary embodiment, a turbine rotor wheel includes a dovetail slot, a cooling slot, and a machined portion between the dovetail slot and the cooling slot. The machined portion has a geometry that results in lower stress than a non-machined dovetail acute corner formed by the dovetail slot and the cooling slot. Also, the machined portion has less strained material volume than a non-repaired dovetail acute corner formed by the dovetail slot and the cooling slot for a like number of operating hours and conditions.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a process of machining a turbine rotor wheel, a repair tool for machining a turbine rotor wheel, and a turbine rotor wheel that do not suffer from one or more of the above drawbacks. With the production and/or repair methods described herein applied, embodiments of the present disclosure permit extended usable life of turbine rotor wheels by reducing stress, generally restoring the operational properties of the turbine rotor wheel, permit machining in a simple and inexpensive manner, and combinations thereof.

Figure 1:
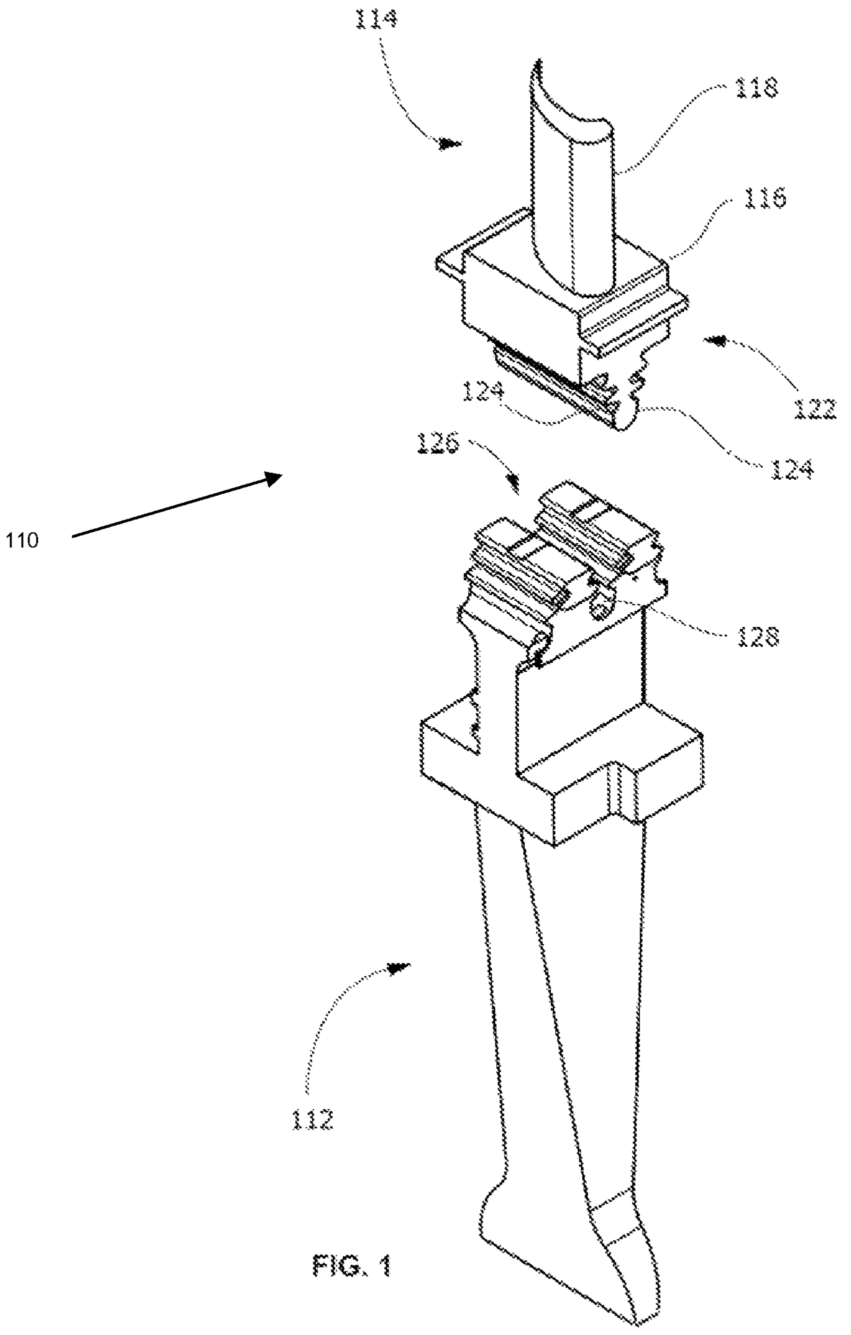
FIG. 1 is a perspective view of a portion of a turbine including a turbine blade and a turbine rotor wheel.

FIG. 1 is a perspective view of portions of a turbine 110 including a rotor wheel 112 and a blade 114. Generally, the turbine 110 includes multiple rotor wheels 112, blades 114, and other turbine components (for example, a compressor, a shaft, vanes, or other suitable components). Gas enters the turbine 110 (for example, through an inlet) and is channeled (for example, through the vanes) downstream against the blades 114 and through the remaining stages imparting a force on the blades 114 causing rotor wheels 112 to rotate (for example, around the shaft). The turbine 110 is operably connected to any suitable load (for example, a generator, another turbine, or combinations thereof) thereby permitting the extraction of energy. In one embodiment, operational properties of the turbine 110 include simple cycle performance of about 50 Hz, an output of about 255 MW, a heat rate of about 9250 Btu/kWh, a pressure ratio of about 17 to 1, a mass flow of about 1,400 lb/sec, a turbine speed of about 3000 rpm, an exhaust temperature of about 1100° F., and combinations thereof. In other embodiments, the turbine 110 is part of a combined cycle turbine system.

Each blade 114 mechanically couples to a corresponding rotor wheel 112. The blades 114 are positioned within a turbine stage of the turbine 110, thereby exposing the blades 114 to forces such as high temperatures (for example, between about 1000° F. and about 2000° F., about 1000° F., about 1250° F., about 1500° F., about 2000° F., or about 3000° F.) from hot gases passing through the turbine stage. In one embodiment, one or more of the blades 114 includes a platform 116, an airfoil 118 extending from platform 116, and a blade dovetail 122. The blade dovetail 122 includes at least one pair of dovetail tangs 124 used for coupling the blade 114 to the rotor wheel 112.

Figure 2:
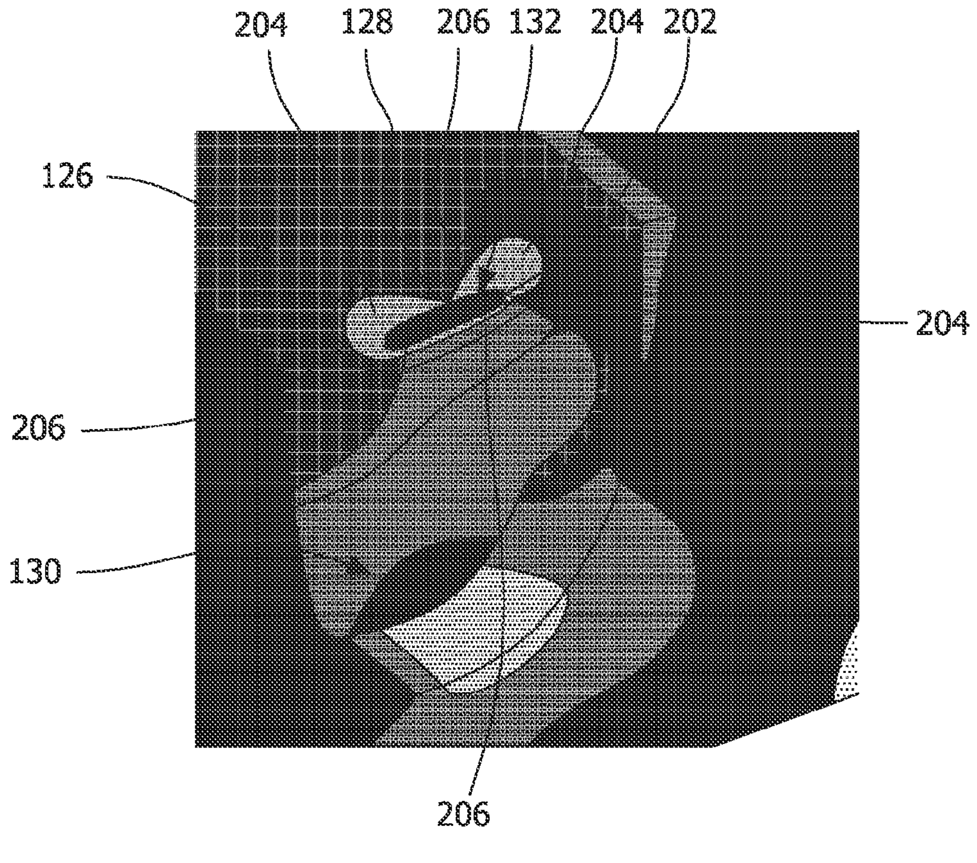
FIG. 2 is a perspective view of a dovetail acute corner between a dovetail slot and a cooling slot of a turbine rotor wheel.

The rotor wheel 112 includes a dovetail slot 126 corresponding to the blade dovetail 122. The rotor wheels 112 are positioned within the turbine stage of the turbine 110 thereby exposing the rotor wheels 112 to forces such as temperatures just below the temperatures of the hot gas path (for example, between about 800° F. and about 1250° F., about 800° F., about 1000° F., about 1250° F., about 1500° F., or about 2000° F.). The dovetail slot 126 is sized and shaped to receive the blade dovetail 122. Referring to FIGS. 1 and 2, the rotor wheel 112 includes a dovetail acute corner 128 formed by the intersection of dovetail slot 126 and a cooling slot 130. Prior to performing the process of the present disclosure, the dovetail slot 126 includes stress region 132 proximal to the dovetail acute corner 128 as shown in FIG. 2. The stress region 132 is based upon stress generated by mechanical and thermal forces and compounded by the shape of the intersecting features. This stress results in the accumulation of strain over time and is reducible according to the disclosure. In one embodiment, the removal of a portion (for example, some of the fatigued material, all of the fatigued material, or a combination of the fatigued material and other material) of the stress region 132 is performed without disassembling any of the turbine 110, the rotor wheel 112, or combinations thereof.

According to a method of reducing stress within the stress region 132 of the rotor wheel 112, the rotor wheel 112 having the cooling slot 130 is formed and the dovetail slot 126 is precisely cut to intersect the cooling slot 130, which creates the stress region 132. In one embodiment, the method further includes identifying the stress region 132 and mapping the stress region 132 as shown in FIG. 2. The cutting removes a portion or all of the stress region 132. For example, referring to FIG. 2, the cutting removes a region of highest stress 202, the region of highest stress 202 and a proximal region of high stress 204, the region of highest stress 202 and both the region of high stress 204 and a portion of a region of lower stress 206, or combinations thereof. The cutting forms a machined portion that includes a geometry that results in lower stress (for example, in comparison to a non-machined dovetail acute corner) formed by the intersection of the dovetail slot 126 and the cooling slot 130.

Figure 3:
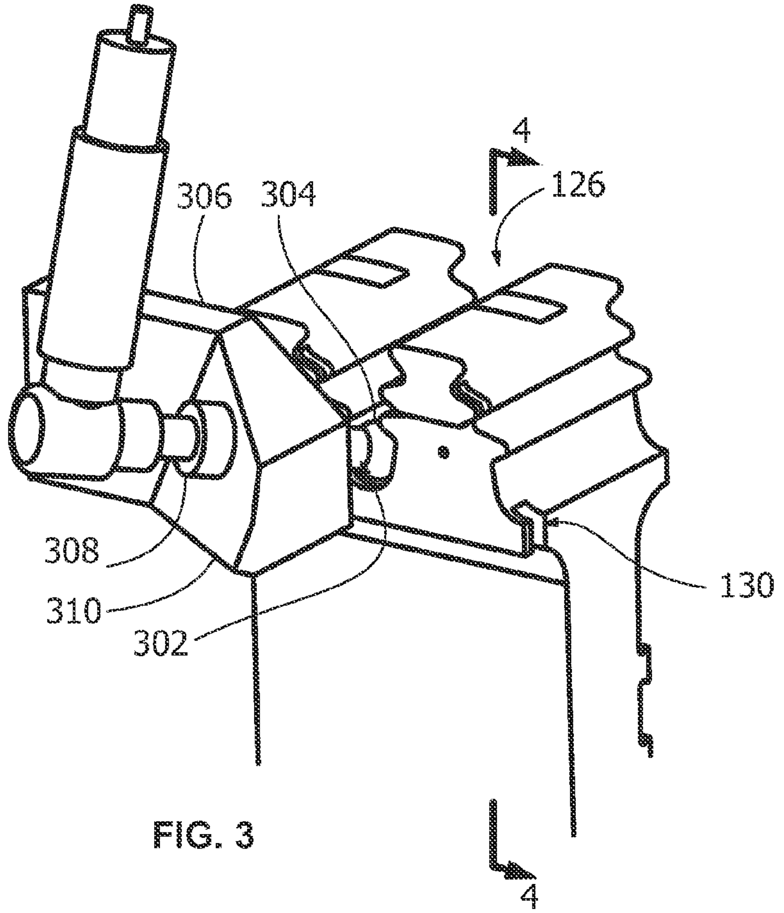
FIG. 3 shows a perspective view of an exemplary turbine rotor wheel and an exemplary repair tool according to the disclosure.
Figure 4:
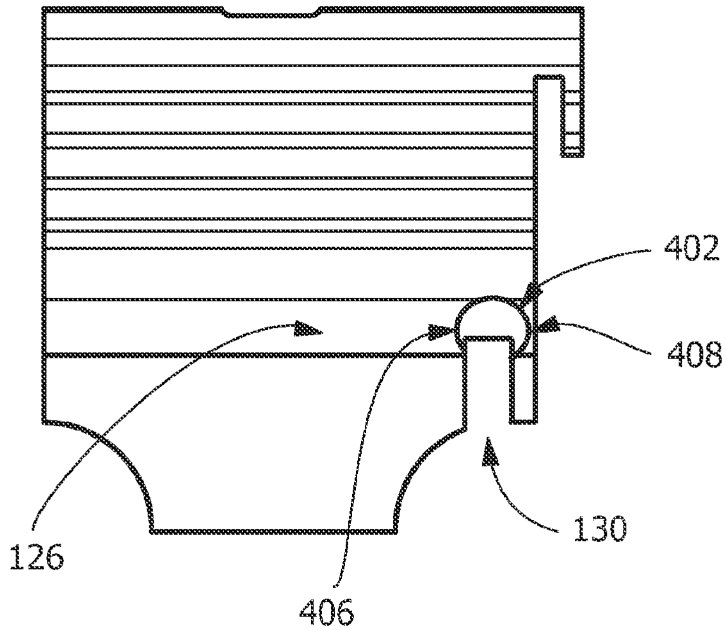
FIG. 4 shows a sectioned view of the exemplary turbine rotor wheel of FIG. 3 taken in direction 4-4.

In one embodiment, the precise cutting of the dovetail slot 126 includes identifying an angle for the cutting, a shape for the cutting, a depth for the cutting, and combinations thereof. Referring to FIG. 3, in an embodiment where the method is a repair method, a repair tool 302 is inserted along a predetermined path (for example, substantially linearly) to cut a predetermined repair shape 402 as shown in FIG. 4 (for example, portions of a spheroid shape). In this embodiment, the removal is by a single machining action with a predetermined angle, shape, and depth.

In one embodiment, the repair tool 302 is inserted into the dovetail slot 126 in a substantially linear direction to remove all or a portion of the stress region 132 (see FIG. 2) proximal to the dovetail acute corner 128 (see FIG. 2). In one embodiment, the repair angle is about 20 degrees above parallel from the dovetail slot 126 and about 40 degrees laterally from being along a line with the dovetail slot 126. Referring to FIG. 4, in one embodiment, the removed portion extends from a first portion 406 proximal to the interior of the dovetail slot 126 to a second portion 408 beyond the cooling slot 130.

Referring to FIG. 3, the repair tool 302 includes a repair tool cutting portion 304 for removing the predetermined shape. The amount of material removed proximal to the stress region 132 is based upon the predetermined repair shape 402 for the cutting. In one embodiment, the repair tool 302 removes a portion, such as a spheroid shape, having a predetermined diameter (for example, between about 0.50 inches and about 1.00 inches, or about 0.8125 inches) resulting from inserting the repair tool 302 a predetermined depth. In this embodiment, the repair tool cutting portion 304 of the repair tool 302 shown in FIG. 3 is hemispherical to remove the portion of the spheroid shape. In one embodiment, the repair tool cutting portion 304 is a carbide ball or other suitable cutting material on the repair tool cutting portion 304. In one embodiment, the repair tool 302 includes features for performing the repair method. For example, the repair tool 302 includes a securing mechanism 306 for engaging and securing the rotor wheel 112 (or a portion of the rotor wheel 112) in a fixed and single orientation, a stop mechanism 308 preventing the cutting from being beyond the predetermined depth, a guide mechanism 310 for directing the cutting along the substantially linear direction at the repair angle, other suitable features for permitting repeated and precise cutting without complex tools or substantial training of technicians, and combinations thereof.

The securing mechanism 306 is self-aligning. In one embodiment, the securing mechanism 306 mounts as a slide into the dovetail slot 126. In another embodiment, the securing mechanism 306 engages the cooling slot 130.

The guide mechanism 310 limits the angle to a predetermined angle, a predetermined set of angles, or a predetermined range of angles. In one embodiment, the guide mechanism 310 permits only one angle of cutting/removal of material. In one embodiment, the guide mechanism 310 permits only two angles of cutting/removal of material.

Other suitable features are also included within the repair tool 302 operation (for example, repair tool 302 being accompanied by a vacuum system for machining chip removal).

Figure 5:
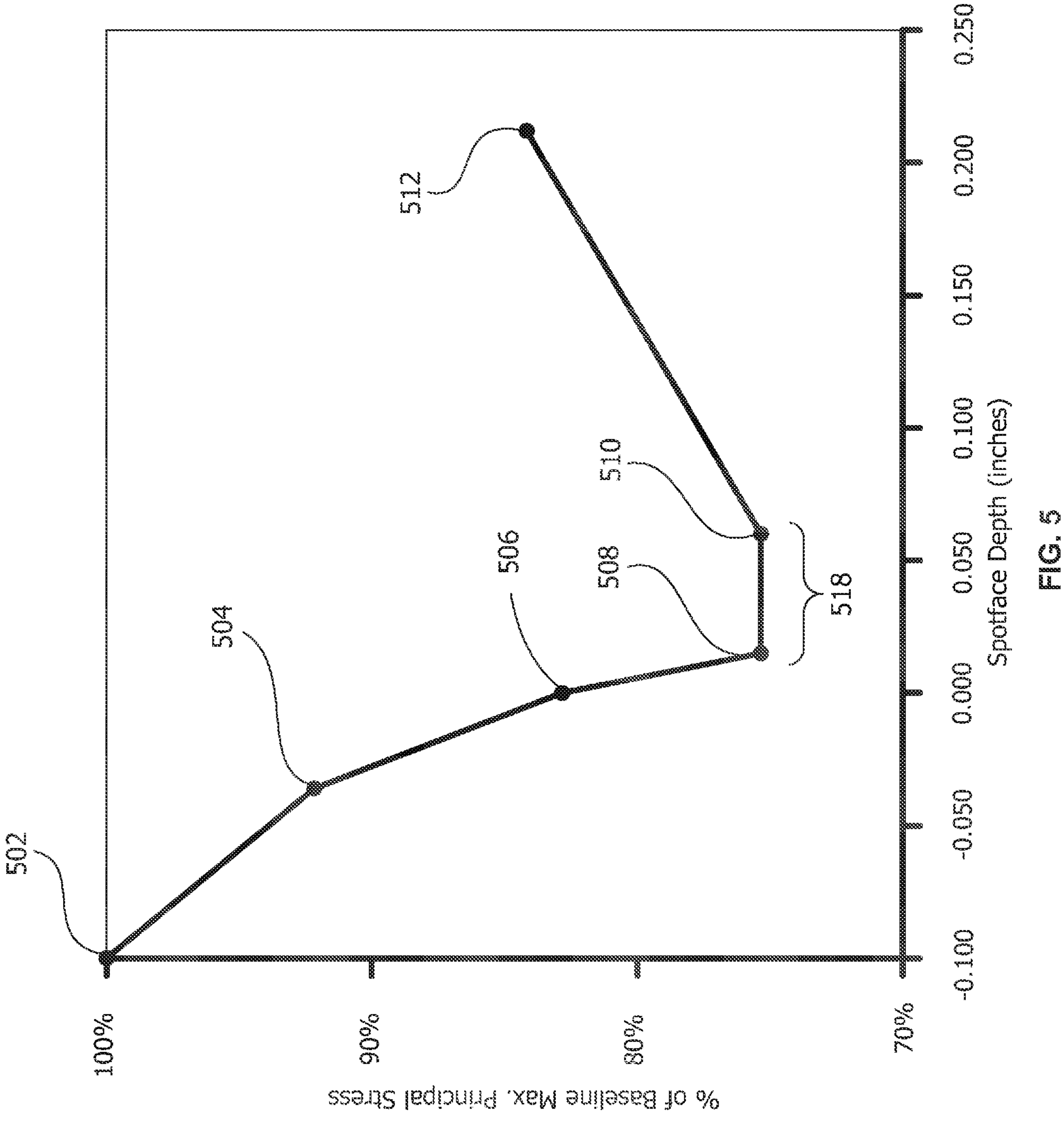
FIG. 5 shows a plot of stress for a turbine rotor wheel based upon a depth of material removed from a dovetail acute corner between a dovetail slot and a cooling slot according to the disclosure.

In one embodiment, the diameter of the predetermined repair shape 402, the predetermined depth of the removal, and combinations thereof correspond to a predetermined principle stress (for example, a minimum principle stress) and/or a percent of baseline principle stress (for example, a maximum reduction of principle stress). FIG. 5 shows such relationships for an embodiment where the stress region 132 protrudes from the dovetail acute corner 128 prior to material being removed according to the present disclosure. The relationships shown in FIG. 5 are based upon the repair tool cutting portion 304 of the repair tool 302 having a diameter of between about 0.25 inches and about 0.75 inches, or about 0.625 inches. In other embodiments, the range is between about 0.25 inches and about 1.50 inches, between about 0.25 and about 0.75 inches, or between about 0.50 inches and about 1.25 inches. In the embodiment described in FIG. 5, a baseline stress value 502 shows the relative stress value when no material is removed. Relative values are also shown based upon the predetermined depth of material removed from a maximum stress location. For example, a first value 504 corresponds with 0.0625 inches being removed but no material removal at the maximum stress location. A second value 506 corresponds with 0.100 inches being removed at which point the cutter depth is flush with the maximum stress location. A third value 508 corresponds with 0.013 inches being removed from the maximum stress location. A fourth value 510 corresponds with 0.060 inches being removed from the maximum stress location. A fifth value 512 corresponds with 0.213 inches being removed from the maximum stress location. In one embodiment, the depth of the material removed corresponds to a predetermined range 518 (for example, the range between the third value 508 and the fourth value 510). For example, removal of the predetermined range 518 reduces stress by removing a predetermined amount of the region of highest stress 202, the proximal region of high stress 204, and the portion of the region of lower stress 206. The range 518 results in the largest stress reduction without regard to the removal of strained material volume which corresponds to a production method. Additionally or alternatively, in another embodiment, a range between the fourth value 510 and the fifth value 512 removes a larger volume of material with lower stress reduction. This corresponds to a repair method to extend the fatigue life of the feature by removing a larger volume of strained material.

Figure 6:
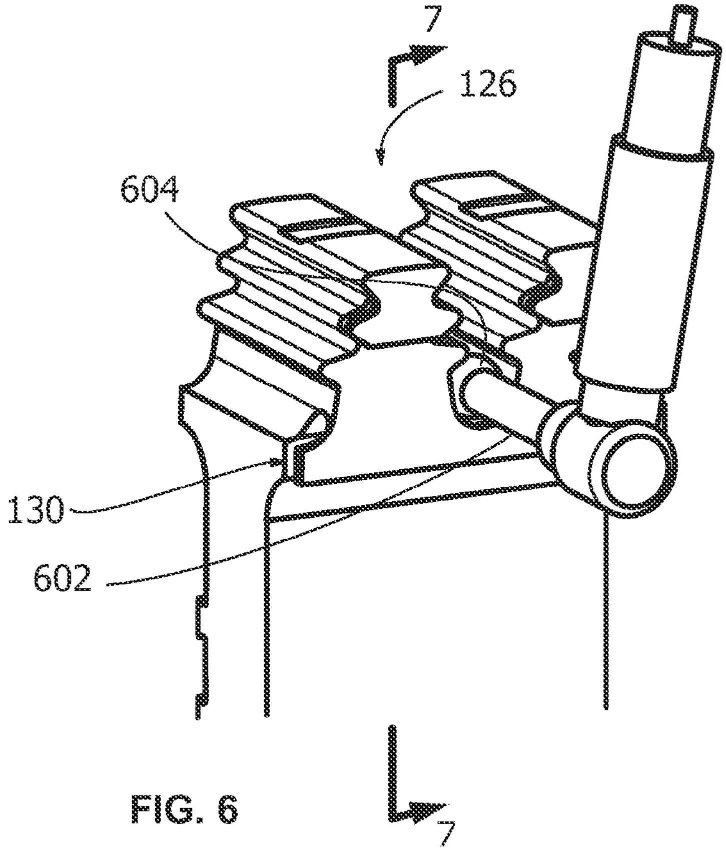
FIG. 6 shows a perspective view of an exemplary turbine rotor wheel and a production tool according to the disclosure.
Figure 7:
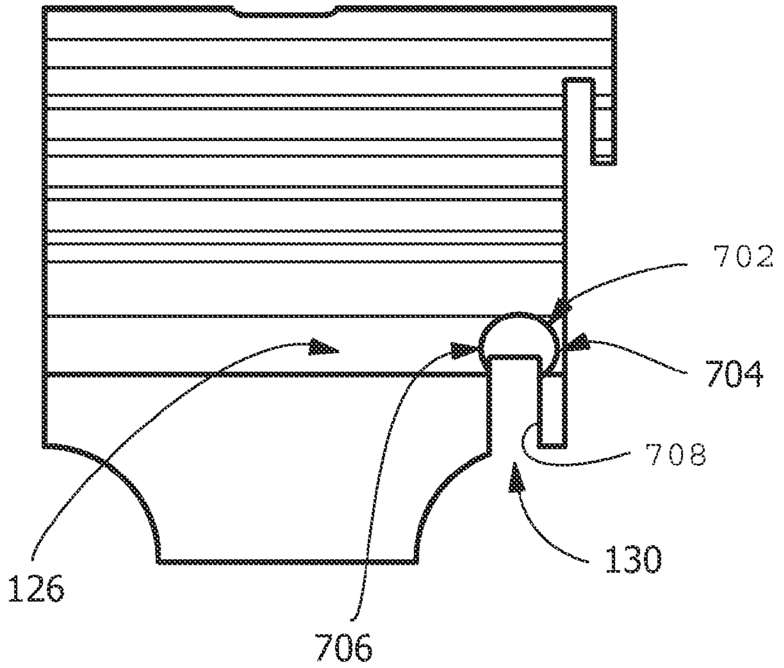
FIG. 7 shows a sectioned view of the exemplary turbine rotor wheel of FIG. 6 taken in direction 7-7.

Referring to FIG. 6, in an embodiment where the method is a production method, the cutting is achieved with a production tool 602 (for example, a five-axis machining tool) inserted into the dovetail slot 126 and repositioned within the dovetail slot 126 to remove the stress region 132 (see FIG. 2) proximal to the dovetail acute corner 128 (see FIG. 2). The production tool 602 includes a production tool cutting portion 604 for removing a predetermined production shape 702 (for example, a portion of a spherical shape) shown in FIG. 7. The amount of material removed proximal to the stress region 132 (see FIG. 2) is based upon the predetermined production shape 702. In one embodiment, the production tool 602 removes a portion or a spherical shape having a predetermined diameter (for example, 13/16 of an inch) resulting from inserting the production tool 602 a predetermined depth. In this embodiment, the production tool cutting portion 604 of the production tool 602 is a portion of a sphere (for example, a greater portion of the sphere than a hemisphere).

In one embodiment, the production tool 602 is inserted into the dovetail slot 126 at a center portion of the dovetail slot 126 and the production tool 602 is repositioned so that it is proximal to the stress region 132 (see FIG. 2), thereby cutting at a zero degree repair angle (i.e., parallel to the dovetail slot 126 and almost in line with the dovetail slot 126). In this embodiment, the removed portion extends from a first portion 704 within the cooling slot 130 toward a second portion 706 proximal to the interior of the dovetail slot 126. In this embodiment, the region formed by the removal of material does not extend beyond an end 708 of the cooling slot 130 distal from the interior of the dovetail slot 126.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of preparing a turbine rotor wheel, the process comprising:

providing the turbine rotor wheel having a dovetail slot, a cooling slot, and a dovetail acute corner formed by the dovetail slot and the cooling slot;

removing strained material and a stress region from the dovetail acute corner at a predetermined angle above parallel from the dovetail slot, to form a predetermined shape, and to a predetermined depth;

wherein the removing is by a repair tool, the repair tool including a guide mechanism for cutting only along one angle with the turbine rotor wheel positioned in a fixed and single orientation;

wherein the strained material and the stress region from the dovetail acute corner is removed without removal of the turbine wheel from a turbine by the repair tool including a securing mechanism for engaging and securing the tool to a turbine rotor wheel having the dovetail acute corner formed by the dovetail slot and the cooling slot, the guide mechanism for directing removal along the predetermined angle in a substantially linear direction, and a stop mechanism for limiting removal to the predetermined depth, wherein the guide mechanism and the stop mechanism permit removal of the stress region from the dovetail acute corner of the turbine rotor wheel;

wherein the securing mechanism mounts as a slide into the dovetail slot.

2. The process of claim 1, wherein the predetermined depth is a depth range of highest reduction of principle stress in the dovetail acute corner.

3. The process of claim 2, wherein the predetermined depth range is a material removal depth range from the location of maximum principal stress of about 0.013 inches and 0.213 inches for stress reduction and the removal of accumulated strain material.

4. The process of claim 2, wherein the predetermined depth range is a material removal depth range from the location of maximum principal stress of about 0.013 inches and 0.063 inches for maximum stress reduction.

5. The process of claim 1, wherein the removing of the strained material and the stress region is an angle of about 20 degrees above the parallel from the dovetail slot and 40 degrees from being along a line with the dovetail slot.

6. The process of claim 1, wherein the removing is performed without disassembling the turbine rotor wheel.

7. The process of claim 1, wherein the stress region includes a region of highest stress in the turbine rotor wheel.

8. The process of claim 7, wherein the stress region further includes a region of high stress proximal to the region of highest stress in the turbine rotor wheel, the region of high stress having a lower value of stress than the region of highest stress.

9. The process of claim 8, wherein the removing removes a portion of a region of lower stress in the turbine rotor wheel proximal to the stress region, the region of lower stress having a lower value of stress than the region of high stress.

10. The process of claim 1, wherein the removing removes a region extending from a first portion proximal an interior of the dovetail slot to a second portion beyond the cooling slot.

11. The process of claim 1, wherein the removing removes a region having a diameter between about 0.25 inches and about 1.50 inches.

12. The process of claim 1, wherein the removing includes the point at which a cutter depth is flush with the dovetail acute corner at the maximum stress location.

13. The process of claim 1, wherein the removing removes a region extending from a first portion proximal to an interior of the dovetail slot to a second portion that is not beyond the cooling slot.

14. The process of claim 1, wherein the repair tool is self-aligned.

15. The process of claim 1, wherein the repair tool is not a 5-axis tool.

* * * * *